INVENTOR.
Stephen A. Platt

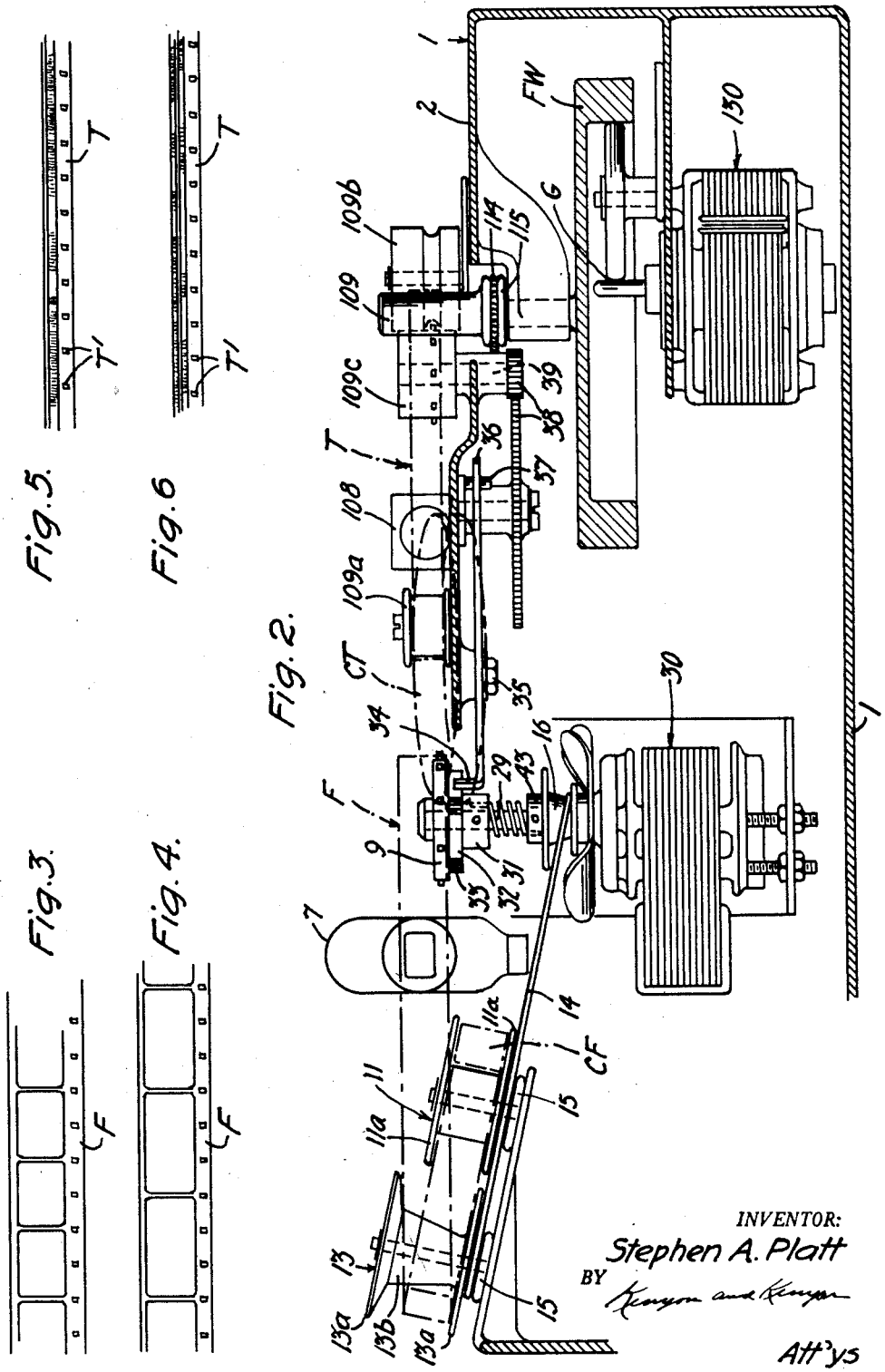

United States Patent Office 2,930,285
Patented Mar. 29, 1960

2,930,285

CONTINUOUSLY OPERATED DEVICE FOR PROJECTING STILL PICTURE FILM WITH SYNCHRONIZED SOUND

Stephen A. Platt, Grand Haven, Mich.

Application January 20, 1956, Serial No. 560,385

5 Claims. (Cl. 88—28)

This invention relates to a continuously operating device for projecting still picture film with synchronized sound. It permits the endless or continuous projection of a series of still pictures, or slides, with the picture sequentially illustrating a story and accompanied by sound properly synchronized with the pictures so as to tell the story being illustrated or to provide an appropriate musical accompaniment, or both.

The present application embraces subject matter disclosed in my co-pending patent application Serial No. 434,213, filed June 3, 1954, for "Process and Apparatus for Creating the Effect of Motion Picture Projection With Synchronized Sound," and now abandoned.

The above application discloses and claims a new process for creating the effect of motion picture projection with synchronized sound. This is effected by projecting each of a series of pictures for a time interval which is substantially longer than the time of the average person's persistence of vision and substantially shorter than the time required for such a person to appreciate an apparent halt in the action portrayed by the pictures. Sound effects characteristically associated by the average person with the various stages of the action portrayed by the projected pictures, is reproduced in synchronism with the projection of the pictures. The sound effects blend the picture action events together so as to create the impression of an uninterrupted flow of picture action. The desired simulation of so-called talking moving pictures is enhanced by having the still picture film shift horizontally and preferably each picture occupies two or three of the standard frame sizes so that the projected picture is very wide as compared to its height.

Furthermore, my mentioned patent application further discloses and claims a novel still picture frame projector and phonograph disk record play-back assembly which are synchronized with each other. The complete device is in the form of a relatively small, compact and sturdy unit which may be manufactured at low cost. The purpose was to provide a unit which can be mass-produced and distributed throughout the world for operation by unskilled persons in connection with the distribution of easily assimilated educational and religious knowledge everywhere.

The above device has fulfilled its purpose satisfactorily with the exception that it suffers from all of the troubles inherent to the operation of a phonograph using disk records. That is to say, it cannot be operated except when standing stationary and relatively free from vibration, the records are necessarily bulky to transport and are easily scratched or otherwise damaged.

With the foregoing in mind one of the objects of the present invention is to provide a device or machine capable of carrying out the described type of process, which may be manufactured economically in large quantities, which may absorb satisfactorily the rough treatment inherent to its transportation and operation in remote places, and which uses magnetic tape to provide the necessary audio.

It is very desirable that a device of the type described can be operated by completely unskilled persons. Such persons may never have seen either a still film projector or a tape recorder, and, therefore, they may know nothing about the threading of film or tape or how to line up or register the film and tape as is required to effect synchronization between the pictures and the sound.

A further object of the present invention is to provide a device possessing all of the advantages previously noted and which is capable of synchronously projecting and reproducing, respectively, endless loops of still picture film and sound tape. Successful operation requires that the film and tape be locked together in synchronism so positively so that the device may be operated continuously or repetitiously without loss of synchronism and without requiring threading of either the film or tape. Obviously such a device is also suited to advertising purposes and the like as well as to the widespread distribution of religious, political and technical information in a manner permitting absorption by relatively uninformed or literally ignorant or savage persons.

A further object of importance is to provide a device of the described character and which is extremely light in weight, very compact and capable of absorbing the abuse incidental to transportation and use in remote and even uncivilized places.

One way to meet the last stated object is through the use of extremely miniaturized film and tape. For example, 16 mm. and even 8 mm. moving picture film, on which the pictures are photographed two and even three frames wide, when horizontally projected provide for a wide screen picture of reasonably good or excellent quality, the size of this film permitting substantial weight and dimensional reductions. The magnetic sound tape industry has produced magnetic tape which is only ¼ of an inch wide yet which is provided with sprocket holes, this again providing great possibilities in the direction of reducing weight and dimensions. The film also, of course, has sprocket holes and by using these products together it becomes possible to positively lock them in synchronism with each other.

Unfortunately the sprocket holes in these products, together with their miniature dimensions, makes them much more fragile than the more usual kind of similar products with their greater size. Therefore, still a further object of the present invention is to provide the described kind of device having the described rugged and shock-resistant qualities yet which is capable of handling the miniaturized film and tape, with their sprocket holes, so gently as to give the film and tape extremely long and useful service lives.

A specific example of the invention is illustrated by the accompanying drawings in which:

Fig. 2 is a vertical cross section;

Fig. 3 illustrates the appearance of either 16 or 8 mm. film on which the pictures are photographed horizontally with double frame widths;

Fig. 4 shows such film when the pictures are photographed three frames wide;

Fig. 5 shows the ¼ inch sound tape, with its sprocket holes, on which a single sound track is recorded; and Fig. 6 shows this tape carrying two sound tracks whereby to permit the use of binaural effect.

Figure 1:
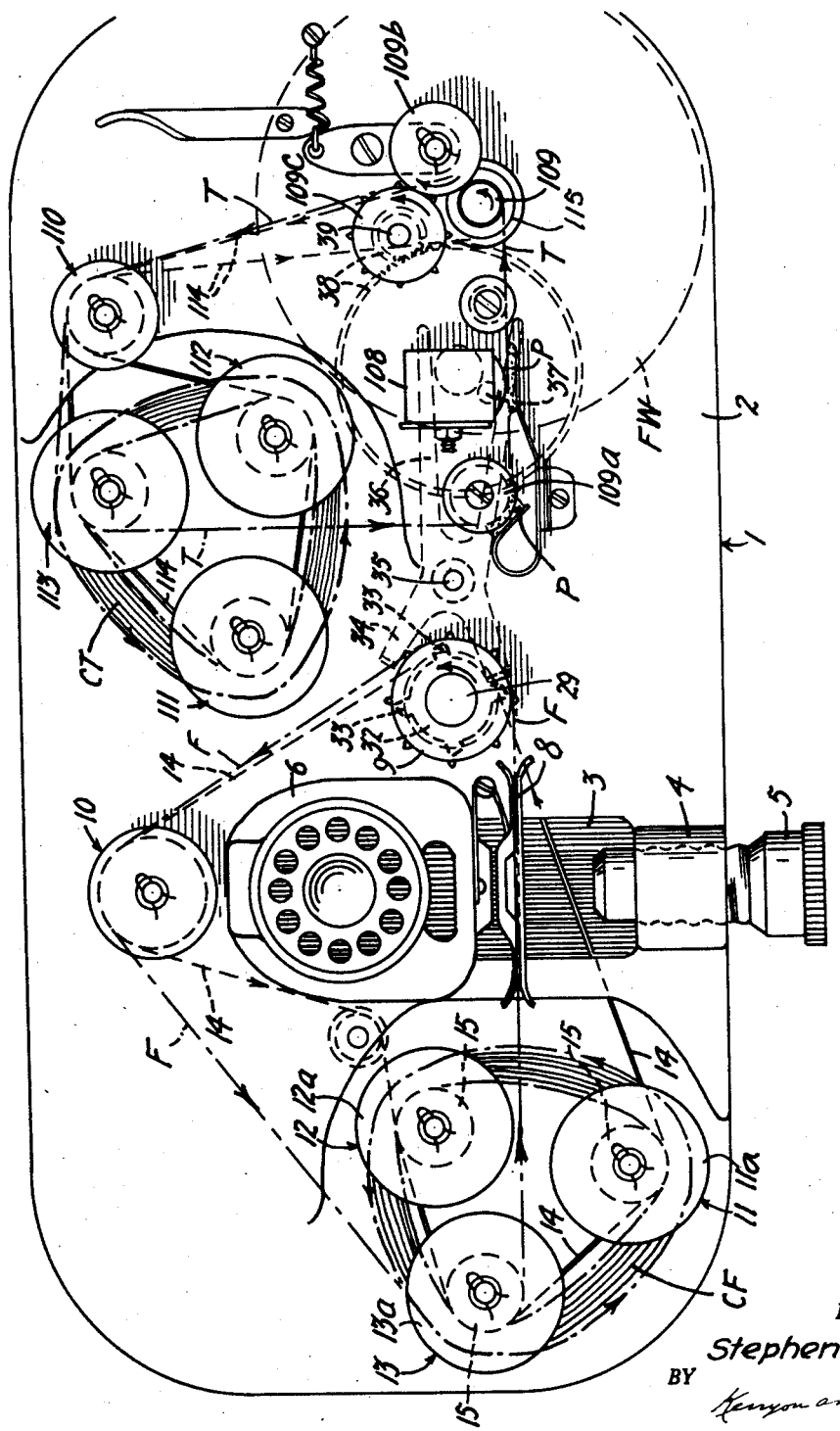
Fig. 1 is a top or plan view.

In this illustrated apparatus or device there is a suitable case or box of which only the lower portion 1 is illustrated. A suitable cover, not illustrated, is provided so as to clip on and cover the working parts of the device in the usual fashion of portable tape recorders and the like.

This lower box portion 1 at the upper edges of its walls includes a top panel or table 2 in which an elongated depression 3 is formed. This depression forms a mounting 4 in which a projecting lens 5 is screwed so as to focus. A short and compact vertical lamp housing 6, for a projection lamp 7, is located at the rear end of the depression 3, the latter terminating about at the transverse center line of the horizontal panel 2. A horizontal film gate 8 is positioned between the lamp housing 6 and the lens 5. It is to be understood that the lamp housing 6 is ventilated and contains the ordinarily necessary reflector and condensing lens system.

The endless loop of horizontal still picture film F is illustrated by the line of long and short dashes, in the drawings. This film is guided horizontally through the film gate 8, is bent around a guide roller 9 so as to extend backwardly until clear from the lamp housing 6, then bent around a guide roller 10 and, finally, the film goes to the outer periphery of a coil of the film CF from the inner periphery of which the film feeds to the gate 8. The coil CF functions to store the balance of the film which is not in the span required to work through the gate 8 and which is defined by the rollers 9 and 10 and, of course, the coiled film.

The film is stored in the coil by triangularly arranged rollers 11, 12 and 13, the roller 13 in effect forming the apex of the triangular arrangement and pointing away from the film gate 8. Each of the rollers 11, 12 and 13 has wide upper and lower flanges 11a, 12a and 13a so as to provide edgewise support for the coiled film.

The various rollers are mounted so that the axes of the rollers 9 and 10 are vertical while the axes of the rollers 11, 12 and 13 slant somewhat from the vertical and are parallel to each other. This slant is in the direction of the film gate 8 and the roller 13 is mounted at a higher level than the rollers 11 and 12. Therefore, the film coil CF slants with respect to the horizontal span of film feeding from and to the coil.

The slant of the coil CF, established by the journaling of the rollers 11, 12 and 13, is made just about enough to permit the film to feed from the inner periphery of the coil, around the hub of the roller 13, horizontally through the film gate 8, around the rollers 9 and 10 and back to the outer periphery of the coiled film at the roller 13. The edges of the film are substantially in planar alignment throughout the span to cause the very slight slant of the coil CF, just sufficient to permit the film to clear the bottom of the coil between the rollers 11 and 12, to impart only an almost imperceptible twist to the film.

It is to be noted that the flanges of the rollers 11 and 12 are in each instance parallel to each other and embrace the coiled film so as to provide just a slight clearance between the film edges and the flanges. The lower flange of the roller 13 is substantially parallel with the lower flanges of the rollers 11 and 12 and all of these flanges extend radially at right angles to the axes of the rollers. The upper one of the flanges 13a, of the roller 13, is spaced so as to engage the upper edge of the span of film leaving this roller.

As is shown by Fig. 2, the lower side of the upper one of the flanges 13a is made with a conical shape. The angularity of this cone is such as to make the lower side of the flange 13a substantially parallel to the horizontal span of film leaving the hub 13b of the roller 13. This guides the film span horizontally and prevents it from being forced vertically in an upward direction. The hub 13b is also conical, the angularity of this cone being such as to make its left-hand side substantially vertical. Therefore, the film span feeds from what is in effect a substantially vertical hub with its top edge engaged by what is substantially a horizontal surface.

All of the rollers 11, 12 and 13 are powered by a belt drive 14 which loops around pulleys 15 connected to the various rollers and which also loops around a pulley 16 which is connected to the shaft of a continuously running electric motor 30. This is the motor 30 that is disclosed in my previously mentioned application. The horizontal span of film F must be fed intermittently so that it shifts at a high rate of speed and then stands still during the projection time, and the belt drive 14 and 15 operate to keep the coil CF continuously formed but relatively loose to permit a picture length of film to be rapidly pulled from the center of the coil. All of the rollers 11, 12 and 13 have highly polished surfaces wherever they engage the film.

Because the film is sufficiently horizontal at all times and is so gently coiled, the service life of the film is very long. The flanges of the rollers 11, 12 and 13 extend radially far enough to project beyond the outside of the coil CF at all times. Therefore, regardless of how the device may be shaken or inverted, the still picture film is safely positioned at all times.

The intermittent action required to shift the film span F is the same as is disclosed and claimed by my previously mentioned co-pending patent application. The following is substantially a quotation from that application.

The sprocket wheel 9 is rotatively mounted on a vertical shaft 29, without being positively fixed thereto. The shaft 29 is continuously rotated by the electric motor 30 and the shaft continuously tries to rotate the sprocket wheel 9 because the shaft is connected to the sprocket wheel through a friction clutch drive 31. The sprocket wheel is held against turning because this wheel has an integral part, an escapement wheel 32 having teeth 33, restrained from rotation by an escapement 34 which must be rocked back and forth on its pivot 35 to permit the wheel 32 to turn and hence to permit this sprocket wheel 9 to turn. When the escapement 34 is moved from one to the other of its extremes of motion one of the teeth 33 escapes, the distance between the various teeth 33 being proportioned so that the sprocket wheel is rotated as required to shift one frame of the film. Each "frame" may be two or three standard frames wide. The rocking of the escapement 34 is controlled by reason of the escapement lever having a forked end 36 within which a crank 37 is located loosely so that when it turns against one or the other of the fork's prongs it trips the escapement lever.

In operation the motor 30 turns at very high speed. The sprocket wheel 19 is locked by the escapement system until the crank 37 trips the lever 34. At that time the sprocket wheel 19 which is very light in weight and of low inertia, is suddenly connected, in effect, to the already rapidly rotating motor 30. Thus the shifting from frame to frame of film is carried out very reliably and at an extremely rapid shifting speed, well beyond the ordinary person's persistence of vision. The shifting direction of the film is from right to left so that on the projection screen the shifting is from left to right. This is in accordance with the requirements of the described process.

Returning to the belt drive 14 and 15, it is to be noted that the belt 14 is driven by the motor 30 through the friction clutch 43 described by my previously mentioned application. Therefore, the rollers 11, 12 and 13 are anchored against rotation during the period that the sprocket wheel 9 is anchored by the escapement action. The span of film F between the sprocket wheel 9 and the roller 13 provides this anchorage. At the same time the rollers 11, 12 and 13 are attempting to turn and so the entire coil CF rotates immediately when the sprocket wheel 9 moves by the action of the escapement. Therefore, the sprocket wheel 9 applies very little tension to pull the film, there being for practical purposes no more tension on the film than would be required for the sprocket wheel 9 to pull on a short length of film free from the roller 13.

The rollers 11, 12 and 13 function as a magazine for storing the balance of the endless still picture film loop not required to form the span of film F. This span of film is kept horizontal throughout by being guided or looped around the lamp housing 6. The slant of the magazine or coiled film CF should not slant much more than is required to permit the film to feed horizontally. This prevents any substantial twisting of the film.

As shown by Fig. 3 16 mm. film may be used with each frame of the present invention comprising two of the standard frames. Fig. 4 shows that each frame may comprise three standard frames. Generally speaking, each frame should be projected for about three seconds but in some cases the projection time may be shortened to about 1½ seconds without unduly lengthening the endless film loop so as to introduce serious storage problems.

The recorded magnetic sound tape is handled in a similar fashion. A span of this tape T is guided across the necessary magnetic tape reproducing head 108, by means of rollers 109 and 110. This numbering agrees with that used in the case of the picture film, to which 100 is added, so that the generally corresponding parts may be identified. The rollers 111, 112 and 113 correspond with those previously described. For a more compact agreement, the tape is guided additionally by roller 109a. The roller 109 is actually a capstan driven at a constant speed, which is a proper sound tape reproducing speed, by a motor 130. The necessary steady speed is effected by the use of a flywheel FW secured to the capstan shaft and driven by the motor 130 through suitable gearing G which may be of the customary friction type used for this purpose.

The belt and pulley drive, for the tape magazine rollers, is shown at 114 and 115. In this case the magazine rollers are driven continuously with the peripheral speeds of the hubs just slightly greater than the peripheral speed of the capstan 109. Slippage between the rollers, of the magazine, and the tape goes on continuously but very slightly. Therefore, there is practically no tension on the tape anywhere, the slanting coiled tape CT being kept in a relatively loose condition at all times. The travel of the belt 114 is somewhat different from that shown in the case of the belt 14, but the principle is the same. Friction pads P may be spring pressed against the tape to hold the latter tightly against the roller 109a of the reproducing head 108.

As previously explained, and as is illustrated by Figs. 5 and 6 the sound tape T is of the ¼ inch wide type having sprocket holes T'. This tape has the advantage that it permits positive synchronization and storage providing for long periods of sound, but it is inherently flimsy and cannot be used were it not for the horizontal and non-twisting advantages of the new magazine arrangement. The tape T is, of course, an endless loop.

An elastically soft roller, such as a "neoprene" roller, 109b presses the tape tightly against the capstan 109. It also presses the tape tightly against a sprocket wheel 109c which is located adjacent to the capstan 109. Therefore, the tape T is locked positively to the roller 109c both frictionally and by the sprocket drive or gear interengagement. The roller 109b may be soft enough to mold itself around the sprockets or it may be grooved to clear the sprockets.

This sprocket wheel 109c drives a shaft 39 which corresponds with the shaft 39 of my previously mentioned application. This shaft is connected by a gear drive 38 which rotates the previously mentioned crank 37. The gear drive 38 is of the reduction gear type with a ratio such that every time three seconds of the sound tape is passed by the capstan 109, the escapement lever 34 is rocked by the crank 37 so as to shift the film. As previously indicated, this time period may be reduced to 1½ seconds in some instances.

It is to be noted that although the capstan 109 drives the tape by friction that slippage at this point is immaterial. It is the sprocket wheel 109c which is geared positively to the tape T, that controls the film shifting timing.

As shown by Fig. 5 the tape may carry only one sound track. Where the advantages of binaural reproduction is required, two sound tracks are possible as is shown by Fig. 6.

As was described in the case of the film, the tape T is positively positioned and cannot possibly become displaced. It is locked positively in synchronism with the film. A cover may be placed over everything to prevent tampering. The device will operate continuously whenever it is plugged in. It is the only device of its character which will stand abuse and continue to be operative at all times.

I claim:

1. A machine for synchronously projecting and reproducing, respectively, endless loops of still picture film and sound tape each having sprocket holes, said machine including a horizontal type projector having a horizontal film gate, guide rollers located so as to guide a horizontal span of said film through said gate with the edges of said span substantially in planar alignment throughout, a plurality of flanged rollers located so as to store the balance of said film in the form of a coil which slants from the edge planes of said span just about enough to permit said span to feed to and from said coil, one of said guide rollers being located adjacent to the exit of said gate and having sprockets for engaging said film positively, means for connecting said sprocket roller rotatively with said flanged rollers, an escapement including a toothed wheel connected to said sprocket roller and a pallet for said wheel, a continuously rotating motor, a friction clutch connecting said motor to said sprocket roller, a horizontal type reproducing head, guide rollers located so as to guide a horizontal span of said tape across said head with the edges of said tape span substantially in planar alignment throughout, a plurality of flanged rollers located so as to store the balance of said tape in the form of a coil which slants just about enough to permit said tape span to feed to and from said coil, one of said tape's guide rollers being located adjacent to the exit side of said head and having sprockets for engaging said tape positively, means operatively coupled to said one of said tape's guide rollers for successively tripping said pallet to effect intermittent motion of said film, means for connecting said tape's sprocket roller rotatively with said flanged rollers, and a continuously rotating motor connected to said tape's sprocket roller.

2. A machine for synchronously projecting and reproducing, respectively, endless loops of still picture film and sound tape each having sprocket holes, said machine including a horizontal type projector having a horizontal film gate, guide rollers located so as to guide a horizontal span of said film through said gate with the edges of said span substantially in planar alignment throughout, a plurality of flanged rollers located so as to store the balance of said film in the form of a coil which slants from the edge planes of said span just about enough to permit said span to feed to and from said coil, one of said guide rollers being located adjacent to the exit of said gate and having sprockets for engaging said film positively, means for connecting said sprocket roller rotatively with said flanged rollers, an escapement including a toothed wheel connected to said sprocket roller and a pallet for said wheel, a continuously rotating motor, a friction clutch connecting said motor to said sprocket roller, a horizontal type reproducing head, guide rollers located so as to guide a horizontal span of said tape across said head with the edges of said tape span substantially in planar alignment throughout, a plurality of flanged rollers located so as to store the balance of said tape in the form of a coil which slants just about enough to permit said tape span to feed to and from said coil, one of said tape's guide rollers being located adjacent to the exit side of said head and having sprockets for engaging said tape positively, means operatively coupled to said one of said tape's guide rollers for successively tripping said pallet to effect intermittent motion of said film, means for connecting said tape's sprocket roller rotatively with said flanged rollers, and a continuously rotating motor connected to said tape's sprocket roller, said means for connecting said sprocket rollers with said flanged rollers in each instance having a gear ratio causing said flanged rollers to rotate at their hubs with peripheral speeds slightly greater than the linear speed of the corresponding span.

3. A machine for synchronously projecting and reproducing, respectively, endless loops of still picture film and sound tape each having sprocket holes, said machine including a horizontal type projector having a horizontal film gate, guide rollers located so as to guide a horizontal span of said film through said gate with the edges of said span substantially in planar alignment throughout, a plurality of flanged rollers located so as to store the balance of said film in the form of a coil which slants from the edge planes of said span just about enough to permit said span to feed to and from said coil, one of said guide rollers being located adjacent to the exit of said gate and having sprockets for engaging said film positively, means for connecting said sprocket roller rotatively with said flanged rollers, an escapement including a toothed wheel connected to said sprocket roller and a pallet for said wheel, a continuously rotating motor, a friction clutch connecting said motor to said sprocket roller, a horizontal type reproducing head, guide rollers located so as to guide a horizontal span of said tape across said head with the edges of said tape span substantially in planar alignment throughout, a plurality of flanged rollers located so as to store the balance of said tape in the form of a coil which slants just about enough to permit said tape span to feed to and from said coil, one of said tape's guide rollers being located adjacent to the exit side of said head and having sprockets for engaging said tape positively, means operatively coupled to said one of said tape's guide rollers for successively tripping said pallet to effect intermittent motion of said film, means for connecting said tape's sprocket roller rotatively with said flanged rollers, and a continuously rotating motor connected to said tape's sprocket roller, said means for connecting said sprocket rollers with said flanged rollers in each instance having a gear ratio causing said flanged rollers to rotate at their hubs with peripheral speeds slightly greater than the linear speed of the corresponding span, said film's guide rollers causing said film span to loop around and, with said film coil, surround said projector, and said tape's guide rollers causing said tape span, with said tape coil, to surround said reproducing head.

4. A machine for synchronously projecting and reproducing, respectively, endless loops of still picture film and sound tape each having sprocket holes, said machine including a horizontal type projector having a horizontal film gate, guide rollers located so as to guide a horizontal span of said film through said gate with the edges of said span substantially in planar alignment throughout, a plurality of flanged rollers located so as to store the balance of said film in the form of a coil which slants from the edge planes of said span just about enough to permit said span to feed to and from said coil, one of said guide rollers being located adjacent to the exit of said gate and having sprockets for engaging said film positively, means for connecting said sprocket roller rotatively with said flanged rollers, an escapement including a toothed wheel connected to said sprocket roller and a pallet for said wheel, a continuously rotating motor, a friction clutch connecting said motor to said sprocket roller, a horizontal type reproducing head, guide rollers located so as to guide a horizontal span of said tape across said head with the edges of said tape span substantially in planar alignment throughout, a plurality of flanged rollers located so as to store the balance of said tape in the form of a coil which slants just about enough to permit said tape span to feed to and from said coil, one of said tape's guide rollers being located adjacent to the exit side of said head and having sprockets for engaging said tape positively, means operatively coupled to said one of said tape's guide rollers for successively tripping said pallet to effect intermittent motion of said film, means for connecting said tape's sprocket roller rotatively with said flanged rollers, and a continuously rotating motor connected to said tape's sprocket roller, said means for connecting said sprocket rollers with said flanged rollers in each instance having a gear ratio causing said flanged rollers to rotate at their hubs with peripheral speeds slightly greater than the linear speed of the corresponding span, said film's guide rollers causing said film span to loop around and, with said film coil, surround said projector, and said tape's guide rollers causing said tape span, with said tape coil, to surround said reproducing head, said projector and head, said guide rollers and said flanged rollers all being arranged in substantially the same horizontal plane.

5. A machine for synchronously projecting and reproducing, respectively, endless loops of still picture film and sound tape each having sprocket holes, said machine including a horizontal type projector having a horizontal film gate, guide rollers located so as to guide a horizontal span of said film through said gate with the edges of said span substantially in planar alignment throughout, a plurality of flanged rollers located so as to store the balance of said film in the form of a coil which slants from the edge planes of said span just about enough to permit said span to feed to and from said coil, one of said guide rollers being located adjacent to the exit of said gate and having sprockets for engaging said film positively, means for connecting said sprocket roller rotatively with said flanged rollers, an escapement including a toothed wheel connected to said sprocket roller and a pallet for said wheel, a continuously rotating motor, a friction clutch connecting said motor to said sprocket roller, a horizontal type reproducing head, guide rollers located so as to guide a horizontal span of said tape across said head with the edges of said tape span substantially in planar alignment throughout, a plurality of flanged rollers located so as to store the balance of said tape in the form of a coil which slants just about enough to permit said tape span to feed to and from said coil, one of said tape's guide rollers being located adjacent to the exit side of said head and having sprockets for engaging said tape positively, means operatively coupled to said one of said tape's guide rollers for successively tripping said pallet to effect intermittent motion of said film, means for connecting said tape's sprocket roller rotatively with said flanged rollers and a continuously rotating motor connected to said tape's sprocket roller, the flanges of said flanged rollers extending radially for distances greater than the radial distance between the inside and outside diameters of the coil stored thereby so that the bottom edges of the coil rest on said flanges, in each instance.

References Cited in the file of this patent

UNITED STATES PATENTS

| | | |
|---|---|---|
| 1,101,760 | Seeman | June 30, 1914 |
| 1,137,912 | Sears et al. | May 4, 1915 |
| 1,604,389 | Cohn | Oct. 26, 1926 |
| 2,136,209 | Finch | Nov. 8, 1938 |
| 2,657,047 | Eddy | Oct. 27, 1953 |
| 2,666,358 | Eash | Jan. 19, 1954 |
| 2,699,332 | MacKenzie | Jan. 11, 1955 |
| 2,820,863 | Swanson | Jan. 21, 1958 |

FOREIGN PATENTS

| | | |
|---|---|---|
| 892,547 | France | Jan. 10, 1944 |
| 495,463 | Italy | June 15, 1954 |